United States Patent
Durham, III et al.

(10) Patent No.: US 10,027,647 B2
(45) Date of Patent: Jul. 17, 2018

(54) MOBILE VOTING AND VOTING VERIFICATION SYSTEM AND METHOD

(71) Applicant: Global Mobile, LLC, Atlanta, GA (US)

(72) Inventors: Lee Ballinger Durham, III, Sandy Springs, GA (US); Scott Hughes, Duluth, GA (US)

(73) Assignee: Global Mobile, LLC, Atlanta, GA (US)

( * ) Notice: Subject to any disclaimer, the term of this patent is extended or adjusted under 35 U.S.C. 154(b) by 0 days.

(21) Appl. No.: 15/265,938

(22) Filed: Sep. 15, 2016

(65) Prior Publication Data
US 2017/0085550 A1  Mar. 23, 2017

Related U.S. Application Data
(60) Provisional application No. 62/220,015, filed on Sep. 17, 2015.

(51) Int. Cl.
| | |
|---|---|
| *H04W 12/06* | (2009.01) |
| *H04L 29/06* | (2006.01) |
| *H04W 4/24* | (2018.01) |
| *H04W 4/12* | (2009.01) |

(52) U.S. Cl.
CPC ............. *H04L 63/08* (2013.01); *H04W 4/12* (2013.01); *H04W 4/24* (2013.01); *G06Q 2230/00* (2013.01)

(58) Field of Classification Search
None
See application file for complete search history.

(56) References Cited

U.S. PATENT DOCUMENTS

| | | | | |
|---|---|---|---|---|
| 2001/0037234 A1* | 11/2001 | Parmasad | ............... | G06Q 10/10 705/12 |
| 2003/0142800 A1* | 7/2003 | Paschal | .................. | G07C 13/00 379/92.02 |
| 2010/0268646 A1* | 10/2010 | Erickson | ................ | G06Q 20/40 705/44 |
| 2010/0287606 A1* | 11/2010 | Machani | ................. | G06F 21/34 726/7 |
| 2012/0278865 A1* | 11/2012 | Sawdy | ................ | G06Q 50/265 726/4 |
| 2014/0058910 A1* | 2/2014 | Abeles | ................. | G06Q 50/265 705/31 |
| 2014/0270401 A1* | 9/2014 | Irwin | ................. | G06Q 30/0185 382/115 |

FOREIGN PATENT DOCUMENTS

WO   WO2002045396 A2 *  6/2002  ............. H04M 3/42

\* cited by examiner

*Primary Examiner* — John W Hayes
*Assistant Examiner* — Jason B Fenstermacher
(74) *Attorney, Agent, or Firm* — Burr & Forman LLP; Ryan M. Corbett

(57) ABSTRACT

A voter verification system and method are provided. The voter verification system may include a mobile messaging aggregator configured to receive voter verification requests from one or more mobile carriers, and a mobile voter verification server configured to verify a voter's identity in response to a voter verification request and generate a voter verified code once the voter's identity has been verified. The mobile messaging aggregator may cause a link to the voter verified code to be transmitted to a mobile device of the voter, which when selected by the voter, allows the voter to cast a vote.

17 Claims, 3 Drawing Sheets

Mobile Verification and Voting

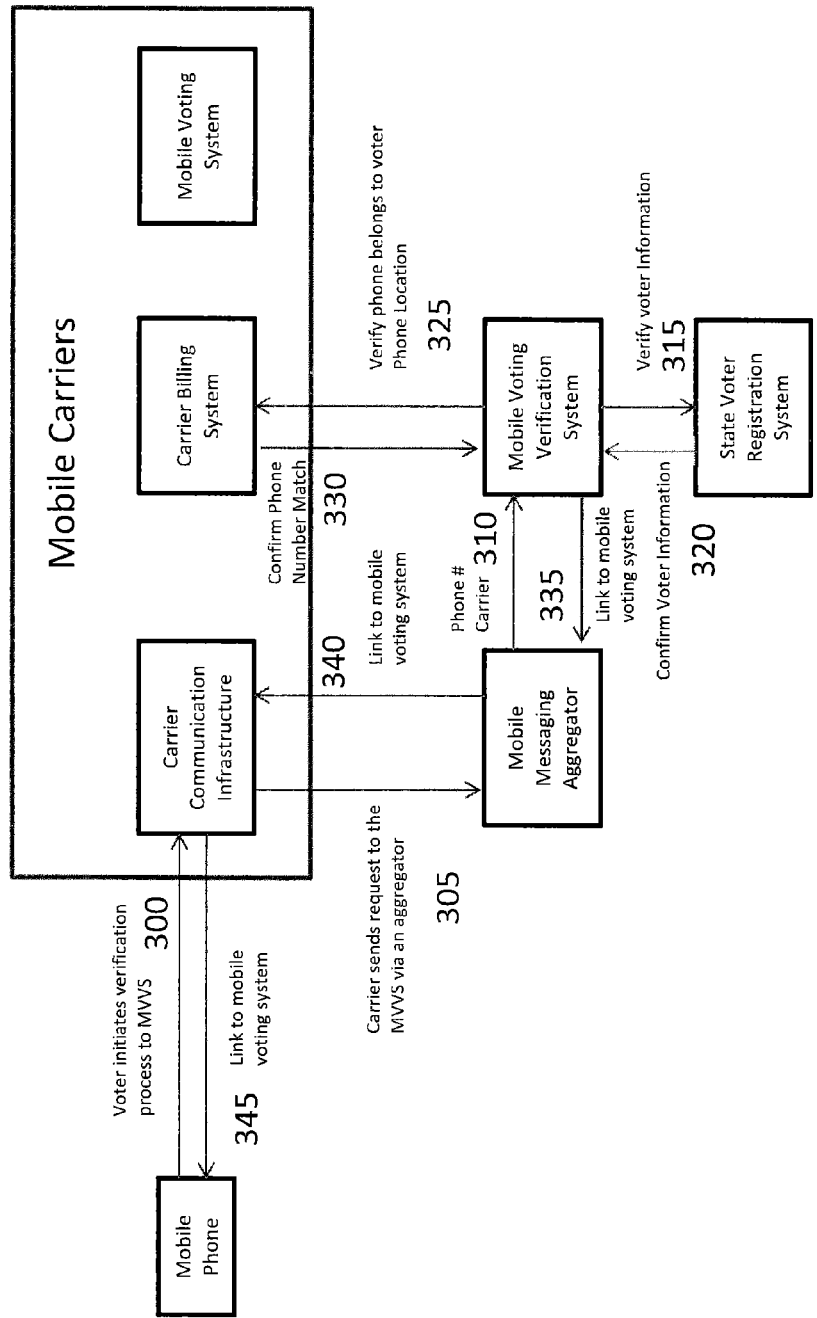
Fig. 3   Mobile Verification and Voting

MOBILE VOTING AND VOTING VERIFICATION SYSTEM AND METHOD

CROSS-REFERENCE TO RELATED APPLICATION

This application claims the benefit of U.S. Provisional Patent Application No. 62/220,015, filed on Sep. 17, 2015, which is incorporated herein by reference in its entirety.

TECHNICAL FIELD

The present disclosure relates generally to a system that provides voter verification for in-person voting, and that enables voters to securely and remotely submit votes in an election.

SUMMARY

The voting process in the United States has remained largely unchanged for decades. Voters typically arrive at polling locations before or after work hours in order to cast their votes for a variety of elected offices. Voters often wait in long lines while election volunteers verify each voter's name and address by comparing the voter's identification, such as a driver's license, to information on file at various municipal, state, or federal government agencies. Once verified, the voter is provided a paper ballot to complete, or is directed to an electronic voting terminal to cast his or her vote. Although election officials have recently incorporated absentee ballots and early voting periods as a way to improve the voting system, the traditional voting system is time consuming and inconvenient. Moreover, this antiquated way of voting and verifying a voter's identity is susceptible to voter fraud, which undermines the integrity of the voting process. In addition, the traditional voting system does not appeal to younger voters, who are increasingly reliant on their mobile devices and more likely to participate in the electoral process if provided with an electronic platform for doing so. Online voting systems have been previously proposed, but many of them suffer from security issues and an inability to verify that each person casting a vote is who they claim to be, and that each voter only is able to vote once. Accordingly, a new system is needed that incorporates the use of now ubiquitous mobile devices to provide increased accessibility, while simultaneously ensuring security.

According to an aspect of one or more exemplary embodiments of the present disclosure, there is provided a mobile voting system that allows for more efficient and secure voter verification, and allows for the voter to vote in-person at the voter's local polling location, or remotely using the voter's mobile device. According to one or more exemplary embodiments, there is provided a voter verification system that allows a voter to verify his or her identity prior to voting, and may include a mobile messaging aggregator configured to receive voter verification requests from one or more mobile carriers, and a mobile voter verification server configured to verify a voter's identity in response to a voter verification request and generate a voter verified code once the voter's identity has been verified. The mobile messaging aggregator may cause a link to the voter verified code to be transmitted to a mobile device of the voter, which when selected by the voter, allows the voter to cast a vote.

The mobile voter verification server may transmit a first request to a voter registrar server with which voters are registered, and may receive a first response indicating whether information contained in the first request corresponds to information stored with the voter registrar server. The mobile voter verification server may generate the voter verified code based on the first response.

The mobile voter verification server may transmit a second request to the voter's mobile carrier billing system, and may receive a second response indicating whether information included in the second request corresponds to information stored in the mobile carrier's database. The mobile voter verification server may generate the voter verified code based on the second response.

The voter verification server may generate the voter verified code if information received in the first response corresponds to information received in the second response.

The information contained in the first request may include at least one of a mobile telephone number associated with the voter's mobile device from which the voter verification request was received, and a password or personal identification number (PIN). The first response may indicate whether one or more of the mobile telephone number, the password or PIN contained in the first request corresponds to a mobile telephone number, password, or PIN stored with the voter registrar server.

The first response may include bibliographic information of the voter, including one or more of the voter's name, address, and birthdate.

The first response may indicate whether the information contained in the first request corresponds to a voter who is deceased or who has had voting privileges suspended or revoked.

The information contained in the second request may include at least one of a mobile telephone number associated with the voter's mobile device from which the voter verification request was received, a type of the voter's mobile device, and bibliographic information associated with the voter. The second response may indicate whether one or more of the mobile telephone number, the type of the voter's mobile device, and the voter bibliographic information corresponds to a mobile telephone number, mobile device type, and voter bibliographic information stored in the mobile carrier billing system.

The second response may include a name that is stored in the mobile carrier billing system and associated with the mobile telephone number from which the voter verification request was received. The mobile voter verification server may generate the voter verified code based on whether the name in the first response matches the name in the second response.

The link to the voter verified code may only allow the voter to cast a vote if the link is selected within a predetermined length of time after it is transmitted to the mobile device of the voter. The link to the voter verified code may cause a mobile ballot to be displayed on the voter's mobile device.

According to another aspect of one or more exemplary embodiments, there is provided a method of verifying voter identity. The method may include receiving voter verification requests from one or more mobile carriers, verifying a voter's identity in response to a voter verification request, generating a voter verified code once the voter's identity has been verified, and causing a link to the voter verified code to be transmitted to a mobile device of the voter, which when selected by the voter, allows the voter to cast a vote.

The step of verifying the voter's identity may include transmitting a first request to a voter registrar server with which voters are registered, and receiving a first response indicating whether information contained in the first request corresponds to information stored with the voter registrar server. The step of generating a voter verified code may include generating the voter verified code based on the first response.

The step of verifying the voter's identity may also include transmitting a second request to the voter's mobile carrier billing system, and receiving a second response indicating whether information contained in the second request corresponds to information stored with the mobile carrier's database. The step of generating a voter verified code may include generating the voter verified code based on the second response.

The voter verified code may be generated if information received in the first response corresponds to information received in the second response.

The information contained in the first request may include at least one of a mobile telephone number associated with the voter's mobile device from which the voter verification request was received, and a password or personal identification number (PIN). The first response may indicate whether one or more of the mobile telephone number, the password or PIN contained in the first request corresponds to a mobile telephone number, password, or PIN stored with the voter registrar server.

The first response may also include bibliographic information of the voter, including one or more of the voter's name, address, and birthdate. The first response may also indicate whether the information contained in the first request corresponds to a voter who is deceased or who has had voting privileges suspended or revoked.

The information contained in the second request may include at least one of a mobile telephone number associated with the voter's mobile device from which the voter verification request was received, a type of the voter's mobile device, and bibliographic information associated with the voter. The second response may indicate whether one or more of the mobile telephone number, the type of the voter's mobile device, and the voter bibliographic information corresponds to a mobile telephone number, mobile device type, and voter bibliographic information stored in the mobile carrier billing system.

The second response may include a name that is stored in the mobile carrier billing system and associated with the mobile telephone number from which the voter verification request was received. The first response may include a name stored with the voter registrar server that is associated with the mobile telephone number from which the voter verification request was received. The voter verified code may be generated based on whether the name in the first response matches the name in the second response.

The link to the voter verified code may only allow the voter to cast a vote if the link is selected within a predetermined length of time after it is transmitted to the mobile device of the voter. The method may also include the step of causing, upon selection of the link, a mobile ballot to be displayed on the voter's mobile device.

BRIEF DESCRIPTION OF DRAWINGS

FIG. 3 is a flow diagram illustrating a mobile voter verification process according to another exemplary embodiment.

DETAILED DESCRIPTION OF EXEMPLARY EMBODIMENTS

Figure 1:
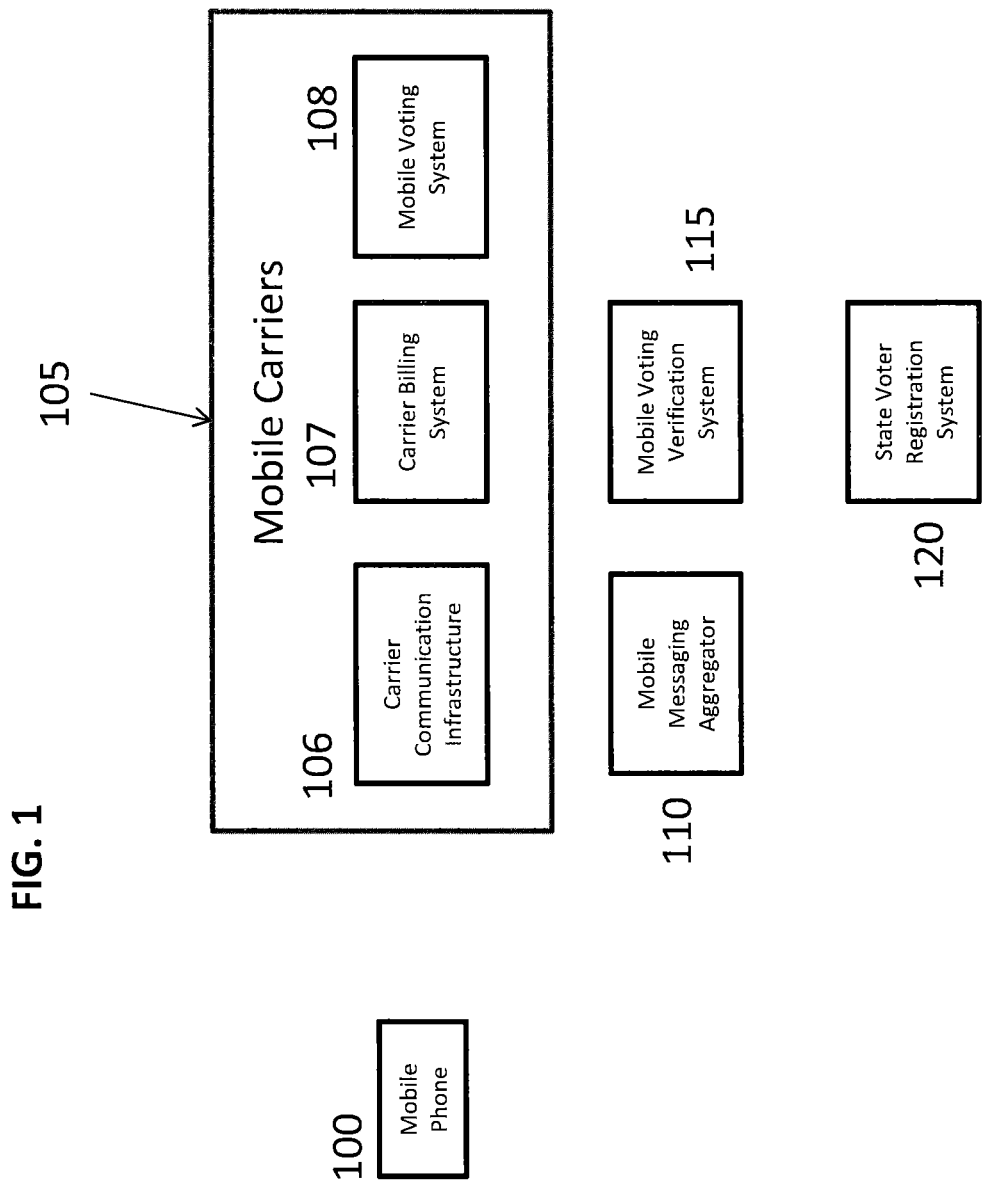
FIG. 1 is a block diagram of a voter verification system according to an exemplary embodiment.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

FIG. 1 shows various components of the voter verification system according to an exemplary embodiment. The voter verification system according to the exemplary embodiment of FIG. 1 may include a mobile phone 100, which may also be any type of mobile device, mobile carriers 105, a mobile messaging aggregator 110, a mobile voting verification system 115, and voter registrar 120 (which may include a voter registrar server and a voter database), which in this exemplary embodiment is a state voter registration system. Each of the mobile carriers 105 may include a carrier communication infrastructure 106, a carrier billing system 107, and a mobile voting system 108. The various components of the voter verification system may communicate with each other, as described below, using various networks, such as the Internet.

In accordance with the exemplary system, a voter registers with a voter registrar 120 to create a voter record in a voter database. However, the voter registrar 120 is not limited to this exemplary embodiment, and may be the Secretary of State of the United States, the Secretary of State of a particular state, or any other government agency or private entity tasked with maintaining the roster of registered voters. At the time the voter registers with the voter registrar, the voter inputs one or more of: the voter's mobile telephone number, mobile billing information, and a password or personal identification number (PIN). For voters that are already registered to vote, they may update their voter registration by providing their mobile telephone number, and optionally a password or PIN, to the voter registrar. Existing voters may provide this information in a variety of ways, including via mail, facsimile, electronic mail, or via the voter registrar's website.

Figure 2:
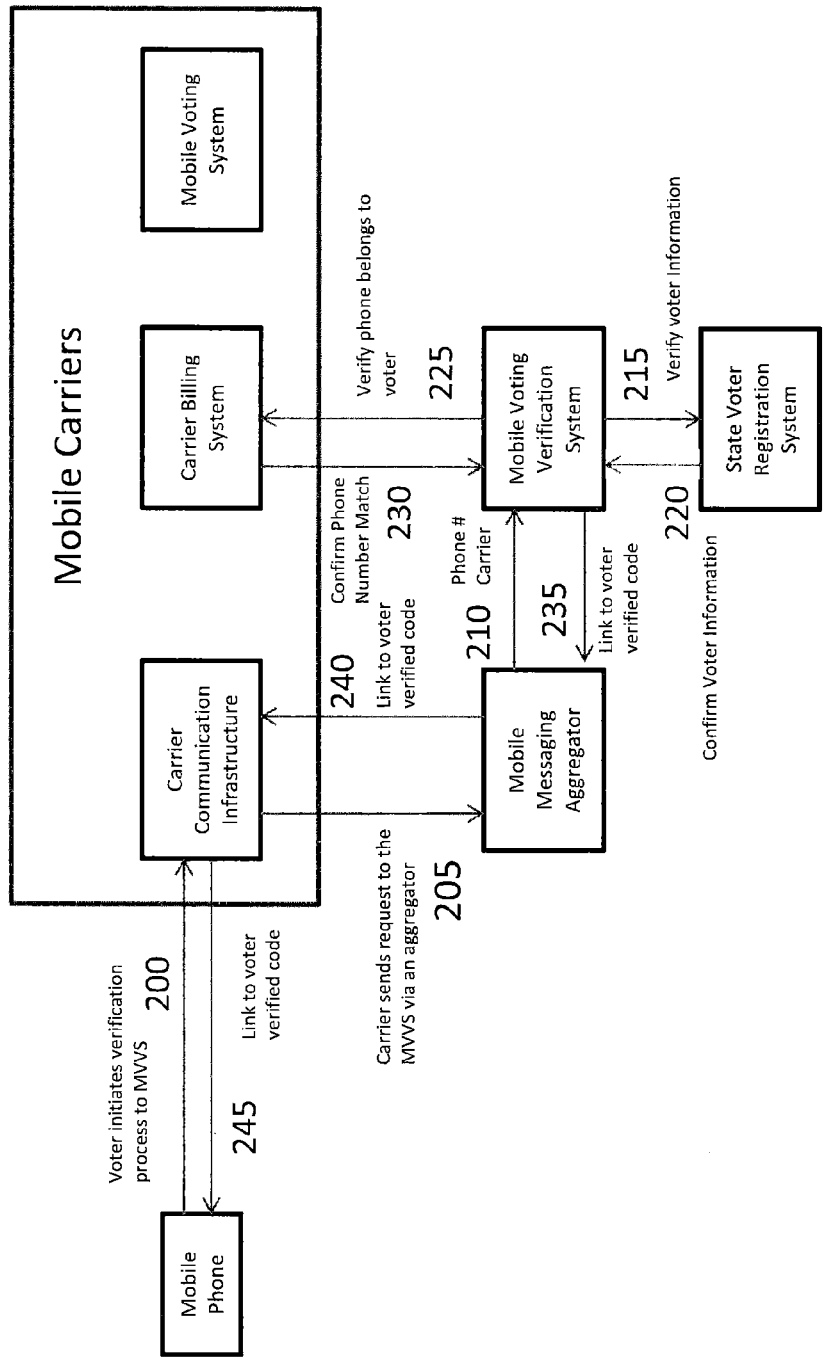
FIG. 2 is a flow diagram illustrating a mobile voter verification process according to an exemplary embodiment.

FIG. 2 shows the process of performing a mobile voter verification according to an exemplary embodiment. The exemplary embodiment of FIG. 2 is explained using the components shown in FIG. 1, however reference numerals for each component are omitted for clarity. According to the exemplary embodiment of FIG. 2, when the user wishes to cast a vote in an election, the voter may initiate the verification process by sending a verification request 200 to the voter's mobile carrier communication infrastructure. The verification request may be sent via short message service (SMS) message, or text message, and/or may also be sent to the carrier communication infrastructure via telephone call, social media post, etc. The user may also initiate the request by accessing a website on the user's computer or mobile device. Alternatively, the user may initiate the request via a software application running on the user's mobile device. Regardless of how the request is initiated, the request may include information identifying the voter, such as the voter's first name. In addition, the request may also include the password or PIN the voter provided to the voter registrar when creating or updating the voter's registration.

The mobile carrier communication infrastructure receives the verification request and in step 205 sends the request to the mobile messaging aggregator. The mobile messaging aggregator aggregates verification requests from one or more mobile carriers and determines the mobile telephone number from which each verification request was received. At step 210, the mobile messaging aggregator sends the verification request, including the mobile telephone number, and optionally the voter's password or PIN, to the mobile voting verification system. The mobile voting verification system may check a log of mobile telephone numbers from which a verification request has been previously received to determine whether the voter has already requested verification to vote. If the mobile telephone number contained in the verification request already appears in the log, the mobile voting verification system may send a rejection signal to the mobile messaging aggregator, indicating that the voter has already voted. If the mobile telephone number contained in the verification request does not appear in the log, the log is updated to include the mobile telephone number, and at step 215, the mobile voter verification system sends a request to the voter registrar server, which includes the mobile telephone number associated with the received verification request. In response to the request from the voter verification system, the voter registrar server determines whether there is a voter record having a mobile telephone number that matches the mobile telephone number associated with the received verification request. If the voter registrar server determines that there is a voter record having a matching mobile telephone number, the voter registrar server may transmit a confirmation signal at step 220 indicating that the mobile telephone number from which the voter verification request was received, matches a mobile telephone number associated with a voter record stored in the registrar's database. The confirmation signal may include other voter bibliographic information from the voter record, such as the voter's name, address, birthdate, and the like. Before sending the confirmation signal, the registrar server may also determine whether a password or PIN included in the verification request matches the password or PIN associated with the voter record in the registrar's database. If the password or PIN in the verification request matches the password or PIN associated with the voter record, the voter registrar server sends the confirmation signal 220 to the mobile voting verification system indicating that the mobile telephone number is associated with a valid voter registration. The voter registrar server may also confirm that the voter record associated with the mobile telephone number does not correspond to a voter who is deceased or who has had their voting privileges suspended or revoked before transmitting the confirmation signal.

Alternatively, if the mobile telephone number associated with the received verification request does not match a voter record having the same mobile telephone number, the registrar server may send a denial signal to the mobile voting verification system at step 220. In addition, if a password or PIN included in the verification request does not match password or PIN associated with a voter record in the registrar's database, the registrar server may send a denial signal to the mobile voting verification system at step 220. Moreover, if the voter registrar server determines that the voter record associated with the mobile telephone number corresponds to a voter who is deceased or who has had their voting privileges suspended or revoked, the registrar server may send a denial signal to the mobile voting verification system at step 220.

In step 225, the mobile voting verification system sends a phone number verification request to the mobile carrier billing system associated with the mobile telephone number from which the voter verification request was received. The phone number verification request may include the mobile telephone number from which the voter verification request was received, mobile device type and any bibliographic data associated with the voter, such as the voter's name and address, etc. The carrier billing system may determine whether the received mobile telephone number matches a mobile telephone number in the mobile carrier's database. The carrier billing system may also determine whether the bibliographic information received from the mobile voting verification system matches the bibliographic billing information contained in the mobile carrier's billing system. If the received mobile telephone number and bibliographic information match the mobile telephone number and bibliographic information in the mobile carrier's billing system, in step 230 the carrier billing system sends a carrier confirmation signal to the mobile voting verification system indicating a match. Alternatively, if the received telephone number and/or bibliographic information do not match the mobile telephone number and bibliographic information in the mobile carrier's billing system, the carrier billing system may send a denial signal at step 230. Though steps 215 and 220 are described herein before steps 225 and 230, the verification requests 215 and 225 may be sent to the voter registrar server and carrier billing system, respectively, simultaneously. Alternatively, even if verification requests 215 and 225 are not sent simultaneously, it is not necessarily required that the mobile voting verification system wait to receive the confirmation signal from the voter registrar in step 220 before sending the phone number verification request 225.

Alternatively, the mobile carrier billing system may receive a phone number verification request that includes the mobile telephone number from which the voter verification request was received, and determine the name of the account owner corresponding to the mobile telephone number. In step 230, the carrier billing system may transmit the name of, and optionally other identifying information relating to, the account holder associated with the received mobile telephone number. The mobile voting verification system may then compare information received from the mobile carrier billing system in the carrier confirmation signal to voter bibliographic information received from the voter registrar server. If the information from the carrier billing system matches the information from the voter registrar server, the mobile voting verification system may generate a voter verified code. Alternatively, the mobile voting verification system may determine an accuracy score based on the extent to which the information from the carrier billing system matches the information from the voter registrar the server. If the accuracy score exceeds a predetermined threshold, the mobile voting verification system may generate a voter verified code.

After the mobile voting verification system receives the carrier confirmation signal confirming that the mobile phone number is associated with the voter, the mobile voting verification system generates a link to a voter verified code, which is sent to the mobile messaging aggregator in step 235. In step 240, the mobile messaging aggregator sends the link to the voter verified code to the carrier communication infrastructure of the mobile carrier from which the verification request was received. In step 245, the mobile carrier communication infrastructure transmits the link to the voter verified code to the mobile phone. The link to the voter verified code may be transmitted via a variety of media, including without limitation, SMS message. The link may only be active for a predetermined length of time after it is transmitted to the mobile phone. For example, the link may expire 5 minutes after it is transmitted to the mobile phone, although other expiration periods may be used.

When the voter selects the link, the user may be provided with a code, such as a QR code, bar code, or other type of code, that confirms the voter is a verified voter. If the voter is at the voter's polling location, the voter may scan the received code at a code scanner, such as a QR code scanner, located at the polling location. The code scanner decodes the information encoded within the scanned code to determine which ballot the voter should receive. The code scanner may then display the ballot so that an election official can provide the correct ballot to the voter. Alternatively, scanning the code may cause the electronic voting system at the polling location to display the appropriate ballot for the voter so that the voter can cast his or her vote.

The voter verification system according to the present disclosure may allow for more efficient and secure voter verification. For example, election volunteers would not be required to compare the voter's identification to a roster of voters to verify the voter's identity and determine whether the voter is voting in the correct location. In addition, the voter verification system of the present disclosure reduces the risk of voter fraud that may otherwise occur if the voter fraud is not detected by a visual inspection of the voter's identification card.

In addition to voting at a physical polling location once the voter has been verified, according to an aspect of one or more exemplary embodiments there is provided a mobile verification and mobile voting system that allows the voter to cast the voter's ballot from the voter's mobile device. FIG. 3 illustrates a mobile verification and voting process according to an exemplary embodiment. According to the exemplary embodiment of FIG. 3, the voter verification steps described above with respect to FIG. 2, i.e., steps 200, 205, 210, 215, 220, 225, and 230 are the same in the exemplary embodiment of FIG. 3, as represented by steps 300, 305, 310, 315, 320, 325, and 330, respectively. A detailed description of these steps in FIG. 3 is not repeated here to avoid redundancy.

After the mobile voting verification system receives the carrier confirmation signal confirming that the mobile phone number is associated with the voter in step 330, the mobile voting verification system generates a link to a mobile voting system, which is sent to the mobile messaging aggregator in step 335. The link to the mobile voting system is sent to the carrier communication infrastructure in step 340, and is then transmitted to the voter's mobile phone in step 345. The link to the mobile voting system may only be active for a predetermined length of time after it is transmitted to the mobile phone. For example, the link may expire five minutes after it is transmitted to the mobile phone, although other lengths of time may be used.

When the voter selects the link, the voter may be provided with a mobile ballot on the voter's mobile phone or other mobile device. The voter is then able to cast votes using the mobile ballot. According to exemplary embodiment of FIG. 3, each carrier may have a mobile voting system within its network. The voting system may only be accessible by a mobile device on each carrier's network. The mobile voting system of the exemplary embodiment may be configured so that mobile devices will only use their carrier's voting system to place their votes. Each carrier's mobile voting system may contain a database of all the possible ballots. Alternatively, a centralized mobile voting system may be used that is independent of the voter's mobile carrier. Once a voter is verified the proper ballot is digitally generated and presented on the voter's mobile device. Voters can view and change any candidate or initiative before submitting their final ballot. Completed ballots may be stored anonymously in the carrier's mobile voting system. All communication during the voting process between the voting system and mobile device is preferably encrypted, and may be encrypted using a variety of encryption methods. Completed ballots are transmitted to the proper election authorities either electronically or manually based on the capabilities of each district.

The mobile messaging aggregator and mobile voting verification system may be embodied, for example, as a software or hardware component, such as a Field Programmable Gate Array (FPGA) or an Application Specific Integrated Circuit (ASIC), which performs certain tasks. One or both of the mobile messaging aggregator and mobile voting verification system may be configured to reside in an addressable storage medium and to execute on one or more processors. Thus, the mobile messaging aggregator and/or mobile voting verification system may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components may be combined into fewer components or further separated into additional components. In addition, the components may be implemented so as to execute on one or more Central Processing Units (CPUs) in a device.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:
1. A mobile voting system comprising:
one or more processors configured to execute instructions stored in a memory, which when executed by said one or more processors perform steps comprising:
receiving voter verification requests from one or more mobile carriers, each of said voter verification requests including a first mobile telephone number from which the voter verification request was received;
determining whether the first mobile telephone number from which one of the voter verification requests was received matches a mobile telephone number from which a previously received voter verification request was received;
in response to determining that the first mobile telephone number from which one of the voter verification requests was received does not match a mobile telephone number from which a previously received voter verification request was received, transmitting a first request containing said first mobile telephone number to a voter registrar server with which voters are registered, and, if the first mobile telephone number matches a phone number associated with a stored voter record, receiving a first response containing information stored with the voter registrar server that corresponds to the first mobile telephone number;
transmitting a second request containing said first mobile telephone number to the voter's mobile carrier billing system, and receiving a second response containing information stored in the mobile carrier's database that corresponds to the first mobile telephone number;

verifying the voter's identity if information received in the first response corresponds to information received in the second response; and in response to verifying the voter's identity, transmitting, directly or indirectly, a link to a mobile device of the voter;

wherein the link is configured to provide a mobile ballot corresponding to the voter's identity.

2. The mobile voting system of claim 1, wherein the information contained in the first request includes at least one of the first mobile telephone number, and a password or personal identification number (PIN); and wherein the first response indicates whether one or more of the first mobile telephone number, the password or PIN contained in the first request corresponds to a mobile telephone number, password, or PIN stored with the voter registrar server.

3. The mobile voting system of claim 2, wherein the first response further comprises bibliographic information of the voter, including one or more of the voter's name, address, and birthdate.

4. The mobile voting system of claim 2, wherein the first response indicates whether the information contained in the first request corresponds to a voter who is deceased or who has had voting privileges suspended or revoked.

5. The mobile voting system of claim 1, wherein the information contained in the second request includes at least one of the first mobile telephone number, a type of the voter's mobile device, and bibliographic information associated with the voter; and wherein the second response indicates whether one or more of the first mobile telephone number, the type of the voter's mobile device, and the voter bibliographic information corresponds to a mobile telephone number, mobile device type, and voter bibliographic information stored in the mobile carrier billing system.

6. The mobile voting system of claim 5, wherein the second response includes a name that is stored in the mobile carrier billing system and associated with the first mobile telephone number;

wherein the first response includes a name stored with the voter registrar server that is associated with the first mobile telephone number; and wherein the mobile voter verification server generates the voter verified code based on whether the name in the first response matches the name in the second response.

7. The mobile voting system of claim 1, wherein the link to the voter verified code only allows the voter to cast a vote if the link is selected within a predetermined length of time after it is transmitted to the mobile device of the voter.

8. The mobile voting system of claim 1, wherein in response to determining that the first mobile telephone number does not match a mobile telephone number contained in a previously received voter verification request, updating a log of mobile telephone numbers from which voter verification requests have been received to include the first mobile telephone number.

9. The mobile voting system of claim 1, wherein in response to determining that the first mobile telephone number matches a mobile telephone number contained in a previously received voter verification request, transmitting a rejection response to the mobile messaging aggregator indicating that a voter associated with the first mobile telephone number has already voted.

10. A mobile voting method, the method comprising:

receiving voter verification requests from one or more mobile carriers, each of said voter verification requests including a first mobile telephone number from which the voter verification request was received;

determining that the first mobile telephone number from which one of the voter verification requests was received does not match a mobile telephone number from which a previously received voter verification request was received;

in response to determining that the first mobile telephone number from which one of the voter verification requests was received does not match a mobile telephone number from which a previously received voter verification request was received, transmitting a first request containing said first mobile telephone number to a voter registrar server with which voters are registered;

receiving a first response containing information stored with the voter registrar server that corresponds to the first mobile telephone number;

transmitting a second request containing said first mobile telephone number to the voter's mobile carrier billing system;

receiving a second response containing information stored with the mobile carrier's database that corresponds to the first mobile telephone number;

wherein the voter's identity is verified based upon a correspondence between information received in the first response and information received in the second response; and in response to verifying the voter's identity, transmitting, directly or indirectly, a link to a mobile device of the voter, wherein the link is configured to provide a mobile ballot corresponding to the voter's identity.

11. The method of claim 10, wherein the information contained in the first request includes at least one of the first mobile telephone number, and a password or personal identification number (PIN); and wherein the first response indicates whether one or more of the first mobile telephone number, the password or PIN contained in the first request corresponds to a mobile telephone number, password, or PIN stored with the voter registrar server.

12. The method of claim 11, wherein the first response further comprises bibliographic information of the voter, including one or more of the voter's name, address, and birthdate.

13. The method of claim 11, wherein the first response indicates whether the information contained in the first request corresponds to a voter who is deceased or who has had voting privileges suspended or revoked.

14. The method of claim 10, wherein the information contained in the second request includes at least one of the first mobile telephone number associated with the voter's mobile device from which the voter verification request was received, a type of the voter's mobile device, and bibliographic information associated with the voter; and wherein the second response indicates whether one or more of the first mobile telephone number, the type of the voter's mobile device, and the voter bibliographic information corresponds to a mobile telephone number, mobile device type, and voter bibliographic information stored in the mobile carrier billing system.

15. The method of claim 14, wherein the second response includes a name that is stored in the mobile carrier billing system and associated with the first mobile telephone number;

wherein the first response includes a name stored with the voter registrar server that is associated with the first mobile telephone number; and wherein the voter verified code is generated based on whether the name in the first response matches the name in the second response.

16. The method of claim 10, wherein the link only provides the mobile ballot if the link is selected within a predetermined length of time after it is transmitted to the mobile device of the voter.

17. The method of claim 10, further comprising:
in response to determining that the first mobile telephone number does not match a mobile telephone number contained in a previously received voter verification request, updating a log of mobile telephone numbers from which voter verification requests have been received to include the first mobile telephone number.

* * * * *